United States Patent [19]

Cuccia

[11] 4,230,033
[45] Oct. 28, 1980

[54] INFUSION DEVICE

[76] Inventor: Bernard Cuccia, Valriant 2, Batiment D3, Le Charrel, Aubagne, France

[21] Appl. No.: 973,556

[22] Filed: Dec. 27, 1978

[51] Int. Cl.³ .............................................. A47J 31/00
[52] U.S. Cl. .................................................. 99/289 R
[58] Field of Search ................ 99/287, 289 R, 289 T, 99/289 D, 289 P, 300, 297, 302 R

[56] References Cited

U.S. PATENT DOCUMENTS

| | | | |
|---|---|---|---|
| 3,266,410 | 8/1966 | Novi | 99/287 |
| 3,440,951 | 4/1969 | Marlet | 99/289 |
| 3,565,641 | 2/1971 | King | 99/287 |

FOREIGN PATENT DOCUMENTS 539887  4/1922  France ........................................ 99/287
1169448  9/1958  France ........................................ 99/287

Primary Examiner—Robert W. Jenkins
Attorney, Agent, or Firm—Sandler & Greenblum

[57] ABSTRACT

A device for automatically producing a coffee infusion by means of a single control for a continuously rotating motor. The device comprises means to proportion a charge of coffee, means to place the charge, means to infuse the charge, means to compress the infused charge so as to form a press cake, and means to eject the press cake. The device further comprises a cam having a single pinion, and first and second racks, the first pinion being arranged so as to simultaneously engage the first and second racks. Th racks are arranged so as to drive each of the means so as to sequentially produce the coffee infusion.

9 Claims, 3 Drawing Figures

INFUSION DEVICE

The object of the invention relates to a distributor, proportioner and ejector device synchronized for the production of coffee infusions.

It has as a purpose to automate the functioning of a percolator device operated by manual action.

Until the present the devices of this type comprised multiple transmissions and could not be activated except manually; furthermore their cost was elevated due to the complexity of their assembly.

The device according to the invention overcomes these inconveniences and makes possible by means of a motor-reducer to automatically obtain with an absolute synchronism, by means of a single control and of a continuously operating motor, the operations of distribution, of proportioning, of charging, of compression, of infusion, and of ejection of the charges.

It is constituted by the combination of a cam comprising two crossed helicoidal grooves, the one ascending, the other decending with departures and arrivals of grooves diametrically opposed, but connected between them by horizontal grooves driven by means of a spur, a movable plate carrying element, but integral with a vertical rack to mesh on a pinion, in turn driving a horizontal and perpendicular rack, itself connected to a mobile frame carrying functional elements, thus the movements synchronize themselves.

On the annexed drawings given by way of nonlimiting example of one of the embodiments of the object of the invention.

Figure 1:
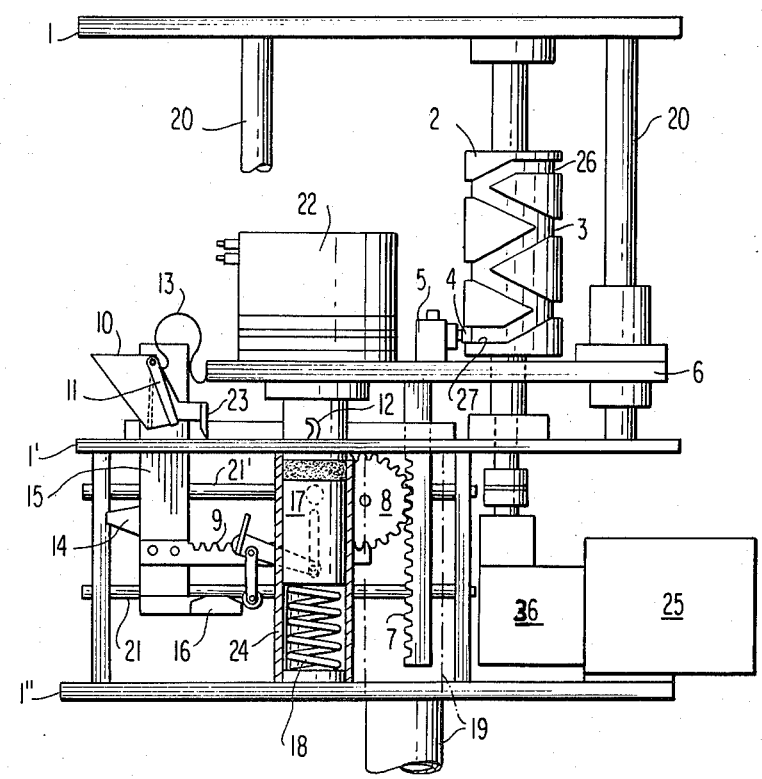
FIG. 1 shows the distributor viewed in its entirety and in elevation.

The apparatus FIG. 1, 2, 3, is driven by a rotateable motor 25 in a single direction of movement with reducer 26.

Figure 2:
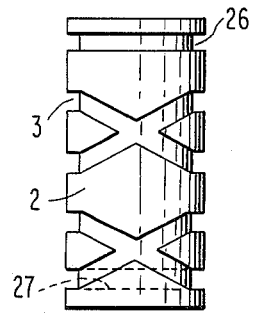
FIGS. 2 and 3 represent the constructional details of the cams and transmissions.
Figure 3:
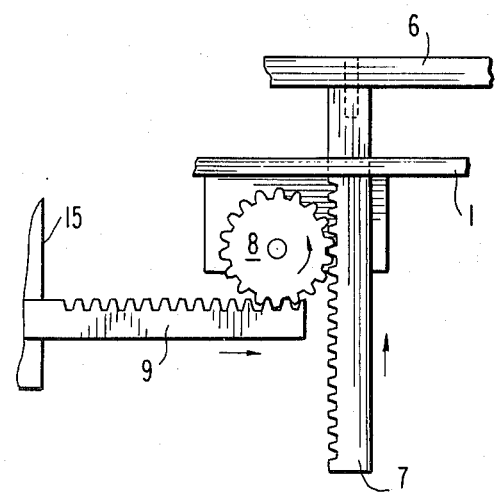

The motor drives the first cam 2 in a continuous fashion in a crossed helicoidal path 3, FIGS. 1 and 2.

This cam transmits a progressive raising and lowering to the vertical translation.

Guided by the columns 20 the horizontal carrier plate 6, serves for the feeding of water. It comprises a kettle infuser block 22, a vertical rack 7, a frame 5 integral with a spur 4 and a pusher for removal of the charges.

This spur 4 caught between its frame 5 and engaged in the groove 3 of the cam 2 transforms the helicoidal trajectory in vertical translation.

At the same time the vertical rack 7 causes the horizontal translation of the functional movement by means of the unique pinion 8.

Guided by the shafts 21, 21', the vertical carrier plate 15 supports at its upper portion, the resevoir 10 and a scraper 23.

This same plate is provided at its median portion with a cam 14 and a cam 16 at its lower portion.

It is likewise connected to the horizontal rack 9 driven, by the toothed-wheel 8, itself activated by the vertical rack 7.

The distribution of the grounds is effected by the collector 10, provided with a trap maintained closed by a spring in rear position. When it is brought into forward position, by the plate 15, two coordinated effects assure the evacuation of the grounds.

This double effect is obtained on the one hand by the lever 11, integral with the trap which is brought against the fixed spur 12, assuring its opening; on the other hand a vibrator shakes the trap open in a fashion such that the grounds fall squarely into the cylindrical receiver.

The grounds, protected by an impermeable sheet 13, coated with appropriate synthetic resin and fixed at its ends on the resevoir 10 and on the edge of the carrier plate 6, prevents during the transfer that the drops of water resting in suspension on the compressor piston 22 wet the interior of the resevoir and the grounds.

The compression of the grounds results from the action of the spring 18 lodged within the receiver cylinder 24, beneath the extractor piston 17.

This assembly compresses the charge and extracts it.

This cam 2, FIG. 1, 2, makes it possible to obtain a double effect. That of the raising and that of the lowering along the profile of its helicoidal grooves 3. The ascending and descending grooves 3 are diametrically opposed, but connected between them by a horizontal groove 26, 27 and others.

These constructional details make it possible to obtain, first in low position, a clean lock perpendicular to the infusion stress and of the injector assembly, then in upper position; they assure a stopping period to the transfers 6 and 15, without interrupting the cam movement 2, motor-reducer 36, 25; which makes it possible for the resevoir 10, to completely empty itself due to the action of the vibrator into the receiver cylinder. Finally in case of breakdown or interruption of the cycle, the spur 4 integral with the carrier plate 6 by its frame 5, and of the cam 2 by the groove 3, blocks all the movements at whatever phase of operation.

In the same axis as the horizontal translation 15 and parallel to the receiver cylinder 24, the tube 19 makes it possible to evacuate the press cakes pushed by the scraper 23 during the movement. A separator combined with a pusher device can break the press cake and avoid blockage in the evacuation conduits.

This assembly has no chasis, and the mechanical assembly is mounted on three support plates 1, 1', 1", which form the structure of the machine which can receive an appropriate chasis.

However, the shapes, dimensions and arrangements of the different elements will be able to vary within the limit of equivalents as well as the materials utilized for their fabrication without changing for this the general conception of the invention which has just been described.

I claim:

1. A device for automatically producing a coffee infusion by means of a single control for a continuously rotating motor, said device comprising means to proportion a charge of coffee, means to place the charge, means to infuse the charge, means to compress the infused charge so as to form a press cake, and means to eject the press cake; said device further comprising a first cam and a single pinion, and first and second racks, said pinion being arranged so as to simultaneously engage, said first and second racks, and wherein said first rack is adapted to be moved by said cam so as to rotate said pinion thereby moving said second rack, said racks being arranged so as to drive each of said means for sequentially producing said coffee infusion.

2. The device as defined by claim 1 wherein said cam is driven by a reducer connected to said motor, and said cam comprises ascending and descending criss-crossing thread channels, said thread channels being connected by means of a horizontal groove.

3. The device as defined by claim 2 further comprising a horizontal carrier plate, said horizontal carrier plate comprising a spur arranged to fit within and cooperate with said thread channels.

4. The device as defined by claim 3 wherein said horizontal carrier plate further comprises said first rack, said first rack being vertical with respect to said horizontal plate and being adapted to be driven by said pinion to raise and lower said plate with respect to said cam.

5. The device as defined by claim 4 wherein said second rack is horizontal and is arranged perpendicular to said first rack such that said pinion simultaneously drives said first and second racks.

6. The device as defined by claim 5 wherein said means for compressing said charge to form said press cake comprises a piston compressor mounted on said horizontal plate.

7. The device as defined by claim 5 further comprising a vertical plate being connected to said second rack, said vertical plate comprising a reservoir, a scraper, a lever, and a vibrator.

8. The device as defined by claim 1 wherein said means to compress said charge to form a press cake is a piston compressor and said device further comprises a receiver cylinder arranged beneath said compressor piston.

9. The device as defined by claim 1 wherein the entire assembly of said means is mounted on three horizontally arranged carrier plates.

* * * * *